May 21, 1929. H. BAILEY, JR 1,714,120
DRAG LINE SCRAPER
Filed April 5, 1927
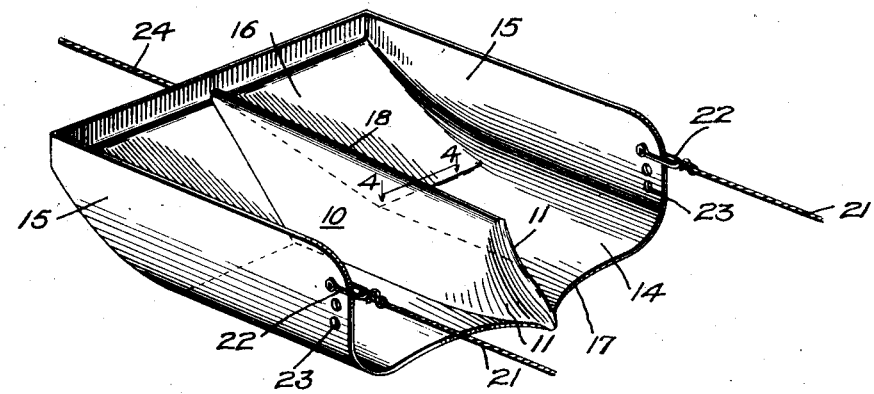
FIG.1.
FIG.2.
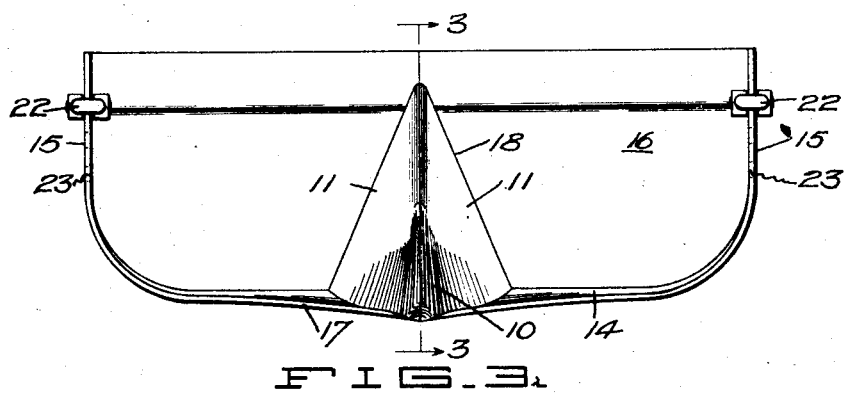
FIG.3.
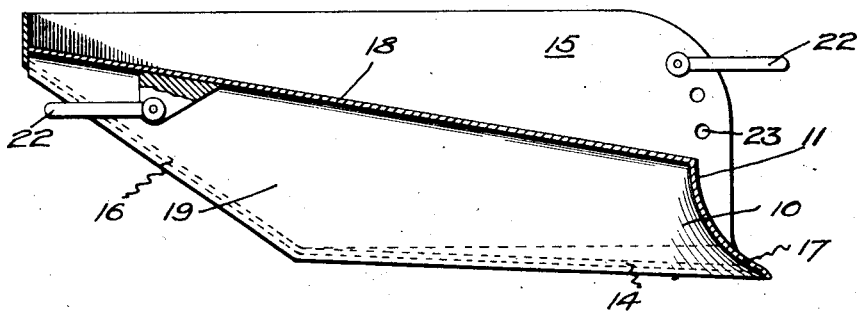
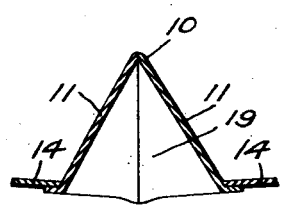
FIG.4.
INVENTOR:
Harlow Bailey, Jr.
BY White, Prost & Fryer
ATTORNEYS.

Patented May 21, 1929.

1,714,120

UNITED STATES PATENT OFFICE.

HARLOW BAILEY, JR., OF SAN FRANCISCO, CALIFORNIA, ASSIGNOR, BY DIRECT AND MESNE ASSIGNMENTS, OF ONE-TENTH TO PETER J. TAMONY, OF SAN FRANCISCO, CALIFORNIA, THREE-TENTHS TO HIMSELF, ONE-FOURTH TO JAMIE H. SMITH, OF SAN FRANCISCO, CALIFORNIA, AND THIRTY-FIVE ONE-HUNDREDTHS TO RUSSELL A. ALGER, JR., OF LOS ANGELES, CALIFORNIA.

DRAG-LINE SCRAPER.

Application filed April 5, 1927. Serial No. 181,038.

This invention relates generally to devices for use in conveying large amounts of material, and has special application to devices of this kind which are dragged back and forth across the material to be conveyed.

It is an object of this invention to devise a drag line scraper of novel construction which will be cheap to manufacture and at the same time will be efficient and effective in use.

It is a further object of this invention to devise a drag line scraper which will be provided with novel means for causing the scraper to dig into the material being displaced.

It is a further object of this invention to devise a drag line scraper in which the advancing edge will dig in beneath the surface of the material until the scraper is filled, and which will ride evenly through the material without skipping or digging into too great a depth.

Further objects of this invention will appear from the following description in which I have set forth the preferred embodiment of my invention. It is to be understood that the appended claims are to be accorded a range of equivalents consistent with the state of the prior art.

Referring to the drawing:

Fig. 1 is a perspective view showing a drag line scraper constructed in accordance with this invention.

Fig. 2 is a front view of the scraper shown in Fig. 1.

Fig. 3 is a cross sectional view taken along the line 3—3 of Fig. 2.

Fig. 4 is a cross sectional view taken along the line 4—4 of Fig. 1.

The invention may be briefly outlined as comprising a plow like member which is convergent forwardly and upwardly so as to displace material upwardly and laterally. Extending upon both sides and to the rear of the plow like member, bucket means is provided to catch and retain the displaced material. The reaction of the material being displaced upon the plow like member creates a force component which tends to urge the advancing edge of the scraper into the material.

Referring to the specific modification of the invention which I have illustrated, there is shown a plow like member 10 which is shaped so as to be convergent forwardly and upwardly as shown. In practice this member is preferably formed of a pair of symmetrical side portions 11 which are connected along their upper and forward edges. The curvature given these side portions 11 is somewhat similar to the curvature ordinarily given to a plowshare so that when the member 10 is forced through material, the material is displaced upwardly and deflected toward both sides. The bucket means for retaining the material displaced by the plow like member preferably includes the bottom wall 14, side walls 15, and rear wall 16. The rear wall 16 is preferably inclined as shown so that the weight of the material of a full bucket will tend to prevent further digging in of the forward end of the device. The bottom wall 14 is preferably provided with a scraping edge 17, the intermediate portion of which preferably merges with the bottom advancing edge of the plow like member 10.

In order to simplify manufacturing and in order to add strength to the device, the plow like member 10 is provided with a rearwardly extending portion 18 which forms a longitudinal rib for the length of the scraper. The bottom and rear walls 14 and 16 respectively are then preferably cut away as shown in Fig. 3 to provide a longitudinal pocket 19 along the bottom of the scraper. This pocket is not essential but is desirable since it aids in guiding the scraper along the desired direction, especially when the device is being dragged backwardly over loose material. The usual drag cables 21 are preferably provided with an adjustable connection to suit varying conditions of operations. For example I have shown these cables as being connected to the side walls 15 by means of clevis connections 22, these connections being insertible in any one of the apertures 23. Cable 24 serves to drag the device backwards over the material being conveyed and is connected as by means of a bracket 26.

In operation, as the device is dragged across the material which it is desired to remove to another point, the plow like member 10 tends to dig into the material and to deflect this material upwardly and laterally into the two sides of the bucket. This deflecting of the material keeps the scraping edge 17 well down below the surface until the sides have been filled with material, after which the weight of the material tends to lift the scraping edge to cause the device to ride upon the surface. After this load has been discharged the device may be dragged backwardly over the material by cable 24, and during this operation the tendency of the device to move in a direction different from that of the pull of cable 24, is offset by the guiding effect of pocket 19. The manner in which this device is manufactured is not material but I prefer to use steel plates welded together the plates forming portions 11 being shaped to provide the correct curvature for the plow like member 10.

I claim:

1. A drag line scraper comprising a bucket having an advancing scraping edge, said bucket having a groove or pocket extending longitudinally of the bucket along the underside thereof, said groove serving as a means to guide the bucket, and a plow like member secured adjacent said scraping edge.

2. A drag line scraper comprising a bucket having an advancing scraping edge, a hollow ridge extending rearwardly from an intermediate portion of said edge to the rear wall of the bucket, said ridge forming an open pocket extending along the underside of the bucket.

3. A drag line scraper comprising a bucket having an advancing scraping edge, and a ridge extending rearwardly from an intermediate portion of said edge to the back wall of said bucket, the forward end of said ridge being convergent to form a plowlike portion.

In testimony whereof, I have hereunto set my hand.

HARLOW BAILEY, Jr.